United States Patent [19]

Anderson et al.

[11] 3,806,658

[45] Apr. 23, 1974

[54] COMMON CONTROLLED EQUALIZATION SYSTEM

[75] Inventors: Harold Peter Anderson; George Albert Lesser, both of Boulder, Colo.

[73] Assignee: Bell Telephone Laboratories, Incorporated, Murray Hill, N.J.

[22] Filed: Oct. 30, 1972

[21] Appl. No.: 302,267

[52] U.S. Cl. .............................. 179/16 F, 179/2 TV

[51] Int. Cl. .............................. H04m 1/76

[58] Field of Search .............. 179/2 DP, 2 TV, 16 F; 333/17, 18, 23, 28, 81; 178/69 R, 69 A

[56] References Cited

UNITED STATES PATENTS

| | | | |
|---|---|---|---|
| 2,578,914 | 5/1971 | Simonelli | 179/16 F |
| 3,564,431 | 2/1971 | Skrydstrup | 333/28 R |
| 3,524,023 | 8/1970 | Whang | 333/18 |
| 3,368,167 | 2/1968 | Graham | 333/18 |
| 3,339,027 | 8/1967 | Feiner et al. | 179/16 F |
| 3,288,932 | 11/1966 | Cleary et al. | 179/2 DP |
| 2,846,509 | 8/1958 | Dubuar | 179/16 F |

OTHER PUBLICATIONS

J. M. Brown, "Baseband Video Transmission on Loops and Short-Haul Trunks," Bell System Technical Journal, February 1971, pages 395–399.

F. A. Korn & A. E. Ritchie, "Choosing the Route," Bell Labs Record, Volume 47, No. 5, May/June 1969, pages 155–159.

*Primary Examiner*—William C. Cooper
*Assistant Examiner*—Randall P. Myers
*Attorney, Agent, or Firm*—D. E. Nester

[57] ABSTRACT

An arrangement in a communication switching system for providing wideband signal equalization on a common basis to a plurality of communication lines. Upon selecting a path from a communication line through the switching system, a common control retrieves information related to the length of the communication line. This information is utilized to condition a variable attenuator in the selected path to attenuate signals conveyed over the line to a predetermined level. The attenuated signals are then amplified by an equalizer in the selected path to a level suitable for further transmission.

11 Claims, 3 Drawing Figures

COMMON CONTROLLED EQUALIZATION SYSTEM

FIELD OF THE INVENTION

This invention concerns communication switching systems and, particularly, it concerns systems in which signal alteration or treatment apparatus is provided to a plurality of communication channels on a shared basis. More particularly, the invention pertains to signal equalization apparatus selectively controllable in accordance with stored information.

BACKGROUND OF THE INVENTION

Wideband signals conveyed over communication paths, such as wire pairs, suffer undesired nonuniform attenuation. This attenuation is particularly acute at the higher frequencies and is also very sensitive to the length of the transmission path. Since a flat transmission response is desirable for the conveyance of wideband signals, equalizers are used to amplify and shape the wideband signals by providing gain equal and opposite to the losses induced by the transmission media.

Some arrangements have been devised in the past for providing equalization to communication lines used for the conveyance of wideband signals. However, these arrangements have been inflexible, costly, and generally required time-consuming installation tests by skilled craftsman.

In one prior arrangement each outgoing wire pair from a PICTUREPHONE video station was provided with a specially adjusted equalizer at the pair's termination in a telephone switching system. This equalizer was manually adjusted by a craftsman who varied certain characteristics of the equalizer to compensate for the attenuation at each of a plurality of test frequencies applied over the wire pair. Since each outgoing wire pair required a dedicated equalizer and since additional equipment bays were required at the switching office to mount the equalizers, this arrangement was both costly as well as space consuming. Another difficulty with this prior arrangement was that installed equalizers could not be bypassed to service calls in which signal equalization was provided by other apparatus.

It is an object of this invention to efficiently and economically provide equalization on a shared basis to a plurality of communication lines.

It is a further object of this invention to vitiate the need for a skilled craftsman to manually test the transmission characteristics of each communication line requiring signal equalization.

SUMMARY OF THE INVENTION

In accordance with the principles of this invention, signals conveyed over a communication line are attenuated by the transmission media itself; and then are further attenuated, in a selected link path through a switching network, by a variable attenuator to a level for which a fixed gain equalizer is adjusted to compensate. In accordance with one illustrative embodiment of this invention, wideband signal equalization is provided on a shared basis to a plurality of video communication lines serviced by an audio-video communication switching network. This equalization is provided by a variable attenuator and a fixed-gain equalizer inserted in series in the video link paths between switching stages of the network. The fixed-gain equalizer is preset to amplify signals conveyed over its link by an amount sufficient to compensate for the normal attenuation induced by a video communication line of a predetermined maximum length. The variable attenuator in series with the equalizer is controllable by a common control to add a selected attenuation sufficient to reduce the strength of signals conveyed over the link to the level for which the equalizer is adjusted. Thus, video wideband signals conveyed over a video communication line suffer attenuation induced by the line itself; and then are further attenuated, in a selected link path through the switching network, by the variable attenuator to a level for which the fixed-gain equalizer is adjusted to compensate. In the selected link path, the fixed-gain equalizer increases the strength of the attenuated signals to a level suitable for further transmission.

More specifically in accordance with this one illustrative embodiment, the common control selects an audio-video routing through the switching network in response to call signals (e.g., dialed digits) received over an audio communication line. The common control accesses a memory at a location associated with this line to retrieve information specifying an attenuation value which is related to the length (i.e. attenuation) of a video communication line associated with the calling audio line. This retrieved information is employed to condition the variable attenuator in the selected video link between switching stages to attenuate signals conveyed over the video line by an amount $A_V$ at a fixed frequency governed by the relationship $A_v = A_{FE} - A_L - C$ where $A_{FE}$ is the amount of amplification provided by the fixed gain equalizer, $A_L$ is the amount of attenuation induced by the video communication line, and C is a constant representing an offset amplification level. Thus, if the video line is 200 feet long and the fixed-gain amplifier is preset to compensate for the attenuation induced by a 700-foot line plus a constant, then the variable attenuator is selectively conditioned to add attenuation equivalent to 500 feet of line.

In accordance with one feature of this invention, a common control selectively accesses a memory at a location associated with a calling line to retrieve line-length information specifying attenuation information associated with the line, which information is utilized to condition a variable attenuator in a selected link path.

In accordance with another feature of our invention, at least certain of the paths between two stages of the switching network include a variable attenuator and a fixed gain amplifier. Advantageously the variable attenuator may include a plurality of different valued attenuator elements selectively switched into the path in accordance with the conditioning information.

GENERAL DESCRIPTION

Figure 1:
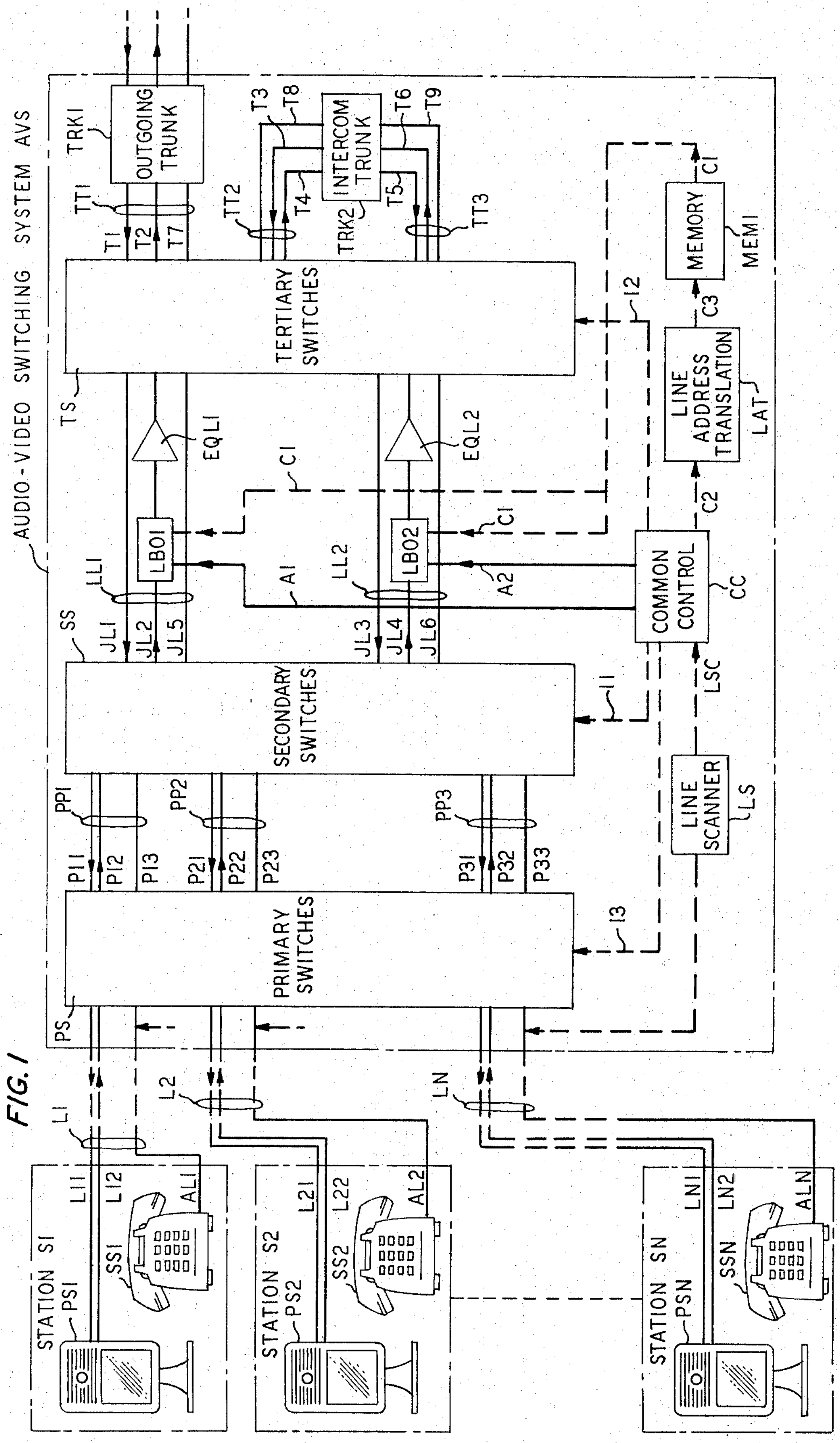
FIG. 1 is a block diagram of an audio-video switching system illustrative of one specific embodiment of our invention.

FIG. 1 is a block diagram depicting an audio-video switching system which provides video signal equalization in accordance with the principles of our invention.

The function of audio-video switching system AVS is to provide audio and video communication service to stations S1–SN. Each of these stations comprises a PICTUREPHONE video set PS1–PSN and a telephone set SS1–SSN. Each of the video sets is adapted to both receive and transmit wideband video signals. Audio and video signals are conveyed between the stations and switching system AVS over cables L1–LN. Each of these cables contains three-wire pairs. A first wire pair is used to convey audio signals and the second and third wire pairs are used to convey video signals in alternate directions.

Switching system AVS is a communication switching office for selectively establishing six-wire connections for conveying audio and video signals. An example of one such system is disclosed in U.S. Pat. No. 3,612,767 of H. P. Anderson, F. K. Becker, R. D. Berryman, N. Botsford, Jr., M. A. Hoffman, and A. P. Ryan III, issued Oct. 12, 1971. Switching system AVS includes three stages of switching which are respectively provided by primary switches PS, secondary switches SS, and tertiary switches TS. Each of these switches comprises a plurality of ferreed switching arrays which are selectively controllable to establish six-wire communication paths between line cables L1–LN and trunk cables TT1–TT3.

Common control CC includes a network controller (not shown) for controlling via cables 11–13 the establishment of connections by the switching stages. The switching network is of the end-marked type which operates as follows. To establish a connection between a particular line terminated on one of the primary switches PS and a particular trunk circuit terminated on one of tertiary switches TS, a marking potential is applied by common control CC to a control lead (not shown) associated with the line and another marking potential is applied to a control lead (not shown) associated with the trunk circuit. Selection circuits (not shown) examine the control paths of the interstage links to find idle links between the marked line and trunk terminations. As a result of this action, a secondary switch SS is selected which, in combination with the marked line and trunk terminations, uniquely defines the idle interstage links for establishing a connection between the marked line and trunk terminations. Common control CC then generates network control signals which cause the operation of crosspoints in the selected secondary switch and the primary and tertiary switches on which the marked line and trunk circuits are terminated. The operation of these crosspoints establishes a connection from the marked line to the marked trunk via the defined interstage links and the three stages of the switching network.

In order to simplify the description of this invention as much as possible consistent with its full disclosure, only two link paths LL1 and LL2 between secondary switches SS and tertiary switches TS have been illustrated. Each of these link paths comprises an audio wire pair, a video wire pair for transmission, a video wire pair for reception and control leads which are not illustrated, In an actual installation a much larger number of such links would be provided in accordance with the traffic handling capacity of the switching system.

Line scanner LS serves as one of common control CC's data acquisition points by monitoring service requests and dialed digits received over wire pairs AL-1–ALN from the telephone sets. Line scanner LS also comprises means for ascertaining the line equipment number of the wire pair over which a service request is received.

Outgoing trunk TRK1 is a well-known trunk circuit utilized in establishing six-wire communication paths from switching system AVS to other remote switching systems not depicted in the drawings. Intercom trunk TRK2 is a well-known trunk circuit utilized in establishing intraoffice communication paths between stations S1–SN. Both of these trunks are representative of a much larger plurality of such trunks which would be utilized in an acutal installation.

In accordance with this illustrative embodiment of our invention, wideband video signal equalization is provided to video sets PS1–PSN on a shared basis by circuitry inserted in the link paths between the switching stages. This circuitry comprises line build-out circuits LB01–LB02 and equalizers EQL1–EQL2. In the depicted arrangement, the line build-out circuits and equalizers are inserted in the link paths between secondary switches SS and tertiary switches TS. However, these circuits could also be inserted in link paths PP1–PP3 between primary switches PS and secondary switches SS.

Line build-out circuits LB01 and LB02 are variable attenuators which are selectively controllable to add attenuation equal to the attenuation induced by various length wire pairs. As hereinafter described in regard to FIG. 2, in this illustrative embodiment each of the line build-out circuits can add attenuation equal to the attenuation induced by wire pairs of 100-foot sections up to 700 feet. Equalizers EQL1 and EQL2 are each fixed-gain amplifiers and wave shapers preset to restore video signals conveyed over a specific length wire pair to a level suitable for further transmission. In this illustrative embodiment, the equalizers are preset to restore video signals conveyed over 700 feet of wire pair.

The amount of attenuation added by the line build-out circuits is controlled in accordance with the length of the video wire pair requiring the equalization. For example, if the video wire pair is 200 feet long and the equalizer is preset to amplify video signals attenuated by 700 feet of wire pairs plus a constant, then the line build-out circuit is controlled to add 500 feet of attenuation to the video wire pair. The amount of attenuation added by the line build-out circuits is controlled by information obtained from memory MEM1.

Upon receiving from scanner LS the line equipment number identifying the wire pair over which a service request was received, common control CC conveys this equipment number to line address translation circuitry LAT. This circuitry comprises logic for converting the equipment number into an address utilized for accessing a specific location in memory MEM1. In this location in memory, line-length information concerning the video wire pair associated with the identified audio wire pair is stored. This line-length information is utilized to condition the line build-out circuits to add the proper attentuation. Cable C1 conveys the line-length information from memory MEM1 to both build-out circuits LBO1 and LBO2. This information conveyed over cable C1 does not alter the present attenuation induced by the line build-out circuits until an enable pulse received from common control CC over either lead A1 or A2, respectively, gates the information into one of the line build-out circuits. This gating technique will be described in regard to FIG. 2.

Associated with each line build-out circuit and equalizer is an actuatable bypass path utilized to bypass video signals around the line build-out circuit and equalizer. This path is actuated when equalization is not needed, such as when a video set is in close physical proximity to switching system AVS. The specifics of the bypass paths will be described in regard to FIG. 2.

Switching Network Operation

In order to facilitate the understanding of the principles of this invention, we will consider an illustrative example in which an audio-video, six-wire communication path is established between stations S1 and S2 depicted in FIG. 1. Telephone set SS1 initiates a call by going off-hook. The off-hook condition of this station is detected by line scanner LS. As is well known in the art, wire pair AL1 over which the service request was detected is identified and a dial tone is conveyed to the calling telephone set. In response to this dial tone, set SS1 generates call signals which specify that an audio-video communication path is to be established to station S2. These signals are detected by line scanner LS which so informs common control CC.

Common control CC causes a six-wire communication path to be established from station S1 to station S2 via intercom trunk TRK2 by performing the following operations. Common control CC applies a marking potential via cable 13 to a control lead associated with audio wire pair AL1 and applies another marking potential via cable 12 to a control lead associated with audio wire pair T8. As previously described, selection circuits then select a secondary switch for establishing the desired connection. Network control signals are then conveyed over the control leads to the selected secondary switch and the marked primary and tertiary switches to operate crosspoints in the three stages. This establishes the audio communication path between wire pairs AL1 and T8 and the video communication paths between wire pairs L11 and T3, and L12 and T4. In a similar manner, common control CC controls the switching stages to establish a six-wire path from line cable L2 to trunk cable TT3 via link cable LL2. Thus, an audio path is completed between sets SS1 and SS2, and a video communication path is completed between video sets PS1 and PS2.

Video Signal Equalization

In the course of controlling the establishment of the previously described audio-video communication path, common control CC also controls the provision of wideband video signal equalization for video sets PS1 and PS2. Line build-out circuit LB01 and equalizer EQL1 are utilized to equalize the wideband video signals transmitted by video set PS1 over wire pair L12. Similarly, line build-out circuit LB02 and equalizer EQL2 provide wideband video equalization for video signals transmitted by video set PS2 and conveyed over wire pair L22.

For this illustrative example, we will assume that video wire pair L12 serving video set PS1 is 400 feet long. We will also assume that equalizer EQL1 is preset to compensate for 700 feet of attenuation. To set line build-out circuit LB01 to the proper attenuation level (i.e., an amount equal to the attenuation induced by 300 feet of wire pair), common control CC conveys the line equipment number of audio wire pair AL1 previously received from line scanner LS to line address translation circuitry LAT. As previously discussed, this circuitry translates the received equipment number into an address utilized to access memory MEM1. The line-length information contained in the memory location defined by this address is read from memory MEM1 and conveyed to both the line build-out circuits via cable C1. In this example, the information specifies that 300 feet of attenuation is to be added to a video wire pair.

This information is gated into line build-out circuit LB01 by an enabling pulse conveyed over lead A1 and generated by common control CC. This enabling pulse is generated from the network control signals utilized by common control CC in causing the switching stages to set up the desired network connection. When, as described above, a secondary switch is selected and a tertiary switch marked in conjunction with establishing a connection between these switches, a unique link path such as LL1 or LL2 is defined since there is only a single link path between each secondary switch and each tertiary switch. By combining the information identifying the selected secondary switch and the marked tertiary switch, the single link path between the switches is defined and an enabling pulse is conveyed over the corresponding lead A1–A2 to the single line build-out circuit in that unique link path. Thus, a line build-out circuit is selectively enabled during the course of establishing a network connection by utilizing the control signals which control the establishment of that connection. And in particular, line build-out circuit LB01 is enabled and conditioned in accordance with the provided line-length information during the establishment of a network connection via link path LL1. An enabling pulse is not, at this time, transmitted over lead A2 to line build-out circuit LB02 since common control CC is not now causing a connection to be established over link path LL2. Rather, as hereinafter described, circuit LB02 will be subsequently conditioned based upon information concerning video wire pair L22. Upon reception of the enabling pulse over lead A1, line build-out circuit LB01 adds attenuation to wire pair JL2 equal to that induced by 300 feet of wire pair.

Video signals transmitted by set PS1 suffer 400 feet of attenuation during their conveyance over wire pair L12 and the attenuated video signals are further attenuated by line build-out circuit LB01 by an amount equal to the attenuation induced by an additional 300 feet of wire pair. Then, equalizer EQL1 amplifies the attenuated video signals by an amount sufficient to compensate for 700 feet of attenuation plus a constant. The amplified signals are further conveyed to video set PS2 via the following wire pairs: T4, T5, JL3, P21 and L21.

The video signals transmitted by video set PS2 over wire pair L22 also require equalization. We will assume that wire pair L22 is 200 feet long and equalizer EQL2 is preset to compensate for 700 feet of attenuation. In the course of controlling the establishment of the network connection to set SS2, common control CC obtains the line equipment number associated with the call digits identifying set SS2 and conveys this number to line address translation circuitry LAT. This circuitry accesses memory MEM1 at a location associated with wire pair AL2. Line-length information, specifying that 500 feet of attenuation is required, is output from memory MEM1 over cable C1. This information does not alter the attenuation induced by line build-out circuit LB01, but rather is utilized to condition line build-out circuit LB02 upon its reception of an enable pulse over lead A2 from common control CC in the same manner as previously described in regard to the enabling and conditioning of circuit LB01. Upon reception of this enable pulse, line build-out circuit LB02 adds attenuation equal to that induced by 500 feet of wire pair to wire pair JL4. Thus, the video signals from set PS2 suffer 200 feet worth of attenuation in traversing wire pair L22 and then are attenuated by an amount equal to an additional 500 feet by line build-out circuit LB02. Finally, equalizer EQL2 amplifies the attenuated signals by an amount sufficient to compensate for 700 feet of attenuation plus a constant. The video signals complete their journey to set PS1 via the following wire pairs: T6, T3, JL1, P11 and L11.

Description of Line Build-Out Circuit LB01

Figures 2, 3:
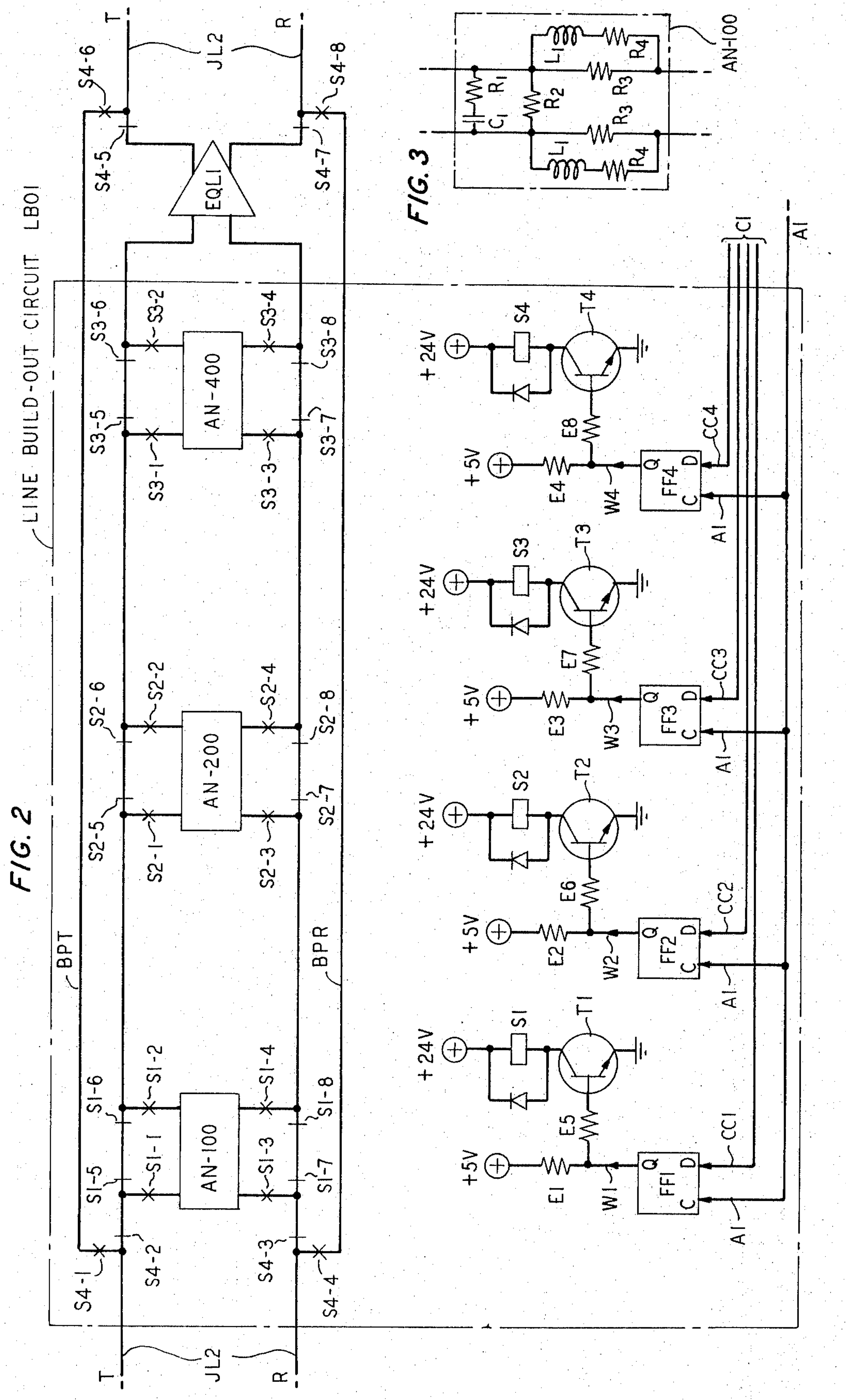
FIG. 2 shows in greater detail line build-out circuit LB01 depicted in FIG. 1.
FIG. 3 is a schematic diagram of the circuit elements in attenuation network AN-100 shown in FIG. 2.

FIG. 2 depicts in greater detail line build-out circuit LB01 illustrated in FIG. 1. Each of the elements and leads depicted in FIG. 2 corresponds to its numerically identical counterparts of FIG. 1.

The function of the depicted line build-out circuit is to add specific amounts of attenuation to wire pair JL2. This circuit includes three attenuation networks AN-100, AN-200, and AN-400. These attenuation networks are respectively adapted to add 100, 200, and 400 feet worth of attenuation to wire pair JL2. The attenuation networks can be connected to wire pair JL2 either singly or in combination. Thus, 100, 200, 300, 400, 500, 600, or 700 feet of attenuation can be added to wire pair JL2.

As previously discussed, the amount of attenuation added to wire pair JL2 is controllable in accordance with line-length information obtained from memory MEM1. This line-length information is conveyed over cable C1 from memory MEM1 to line build-out circuit LBO1. Cable C1 includes four leads CC1-CC4, each respectively connected to one of the flip-flops FF1-FF4. Each of these flip-flops is of the D-type which operates as follows. Upon reception of an enable pulse at input terminal C, the output terminal Q of each flip-flop assumes the same state as the signal on its D input terminal. For example, if the D lead of flip-flop FF1 is LOW, then upon reception of an enable pulse at terminal C over lead A1, output terminal Q will also assume the LOW state.

Each of the flip-flops controls a switching transistor T1-T4 which in turn respectively controls the flow of current through a relay winding S1-S4. The actuation of relays S1, S2, and S3, respectively, connects attenuation networks AN-100, AN-200, and AN-400 to wire pair JL2. The actuation of relay S4 closes bypass paths BPT and BPR around the attenuation networks and equalizer EQL1.

As an illustrative example of the operation of line build-out circuit LBO1, we will assume that the line-length information received over cable C1 specifies that 300 feet of attenuation is to be added. This attenuation is achieved by connecting attenuation networks AN-100 and AN-200 in parallel across wire pair JL2. Leads CC1 and CC2 are HIGH and leads CC3 and CC4 are LOW. Upon reception of an enable pulse over lead A1 from common control CC, the output terminals of flip-flops FF1 and FF2 go HIGH and the output terminals of flip-flops FF3 and FF4 go LOW. Transistors T1 and T2 turn on and current flows through relay windings S1 and S2 through the transistors to ground. Relay contacts S1-1, S1-2, S1-3, and S1-4 operate to connect attenuation network AN-100 across wire pair JL2. Relay contacts S1-5, S1-6, S1-7, and S1-8 also operate, opening the short-circuit path across the attenuation network. In a similar manner attenuation network AN-200 is also connected across wire pair JL2 by the operation of relay contacts S2-1 . . . S2-8. Thus, 300 feet of attenuation is added to wire pair JL2.

Since the outputs of flip-flops FF3 and FF4 are LOW, transistors T3 and T4 do not turn on and current does not flow through relay windings S3 and S4. Thus attenuation network AN-400 is not connected across wire pair JL2 nor is the bypass path (BPT and BPR) enabled.

The previously mentioned bypass paths around the attenuation networks and equalizer are utilized when the wire pair connecting a video set to switching system is less than 100 feet long since signal equalization is not required. This is usually the case if the video set is within the physical confines of the switching system. Bypass paths BPT and BPR are closed when leads CC1-CC3 are LOW and only lead CC4 is HIGH. Upon reception of an enable pulse over lead A1, terminal Q of flip-flop FF4 goes HIGH, transistor T4 turns on, and current flows through relay winding S4. Relay contacts S4-1, S4-2, . . . S4-8 operate to close bypass paths BPT and BPR. The bypass paths are also closed when a malfunction is detected in either line build-out circuit LBO1 or equalizer EQL1.

FIG. 3 illustrates the circuit elements of attenuation network AN-100. This circuitry is well known and is of the type utilized in dedicated line build-out circuits. In accordance with well-known electrical principles, the values of the depicted electrical components are varied to alter the attenuation value of the network.

The above described arrangement is merely an illustrative application of the principles of this invention. Numerous other arrangements pertaining to signal treatment, including equalization, may be devised by those skilled in the art without departing from the spirit and scope of this invention. For example, it is in the purview of this invention to provide impedance matching devices in the switching network and to selectively control these devices to provide one of many impedance levels or states in accordance with stored data concerning the impedances of communication channels served by the switching network.

What is claimed is:

1. In a communication switching system having a switching network including at least two stages having link paths therebetween, said network having communication channel terminations thereon and being selectively controllable to establish communication connections between said terminations, the combination comprising, a plurality of fixed again amplifying means each inserted in a link path, a plurality of variable attenuators each inserted in one of said link paths having a said amplifying means inserted therein and each of said variable attenuators selectively controllable to add selected amounts of attenuation to said one link path, common control means for controlling said network to establish a communication connection from one of said communication channel terminations via a selected link path and for enabling the variable attenuator in said selected link path, and conditioning attenuator control means responsive to said common control means for providing to said variable attenuators attenuator control information defining an attenuation value having a predetermined relationship to the attenuation of the communication channel terminated at said one communication channel termination and to the gain of said fixed gain amplifying means, said enabled variable attenuator being responsive to said attenuator control means to add attenuation to said selected link path in accordance with said provided attenuator control information.

2. The combination according to claim 1 wherein each of said variable attenuators comprises a plurality of attenuation networks and a plurality of switch means responsive to said provided attenuator control information for selectively connecting said attenuation networks to the link path in which said each variable attenuator is inserted.

3. The combination according to claim 2 further comprising, means associated with said each variable attenuator for bypassing said amplifying means and said associated variable attenuator, and said plurality of switch means including means for actuating said bypass means.

4. The combination according to claim 1 wherein said attenuator control means comprises, memory means having a plurality of addressable locations each associated with at least one of said communication channel terminations and having stored therein attenuator control information associated with said at least one communication channel termination, and means responsive to information from said common control means identifying said one communication channel termination for accessing the location in said memory means associated with said one communication channel termination and for providing to said variable attenuators the attenuator control information stored in said accessed location.

5. The combination according to claim 1 wherein each of said amplifying means is preset to amplify signals by an amount $A_{FE}$, the combination further comprising, a communication channel connected to said one communication channel termination for attenuating signals conveyed thereover by an amount $A_L$, and wherein said provided attenuation attenuator control information associated with said one communication channel termination defines an attenuation value $A_V$ governed by the relationship $A_V = A_{FE} - A_L - C$ where C is a constant.

6. In combination, a plurality of lines for conveying signals, memory means having a plurality of locations each associated with at least one of said lines and having stored therein attenuator control information, switch means comprising at least a first stage and a second stage having a plurality of paths therebetween for establishing connections between selected of said lines over said paths, fixed gain amplifier means inserted in at least certain of said paths for amplifying signals conveyed over said certain paths by a predetermined value, variable attenuator means inserted in said certain paths for attenuating signals conveyed over said certain paths, means for controlling said switch means to establish a connection over one of said certain paths between specified lines, means for reading the attenuator control information from the location in said memory means associated with one of said specified lines, and means for varying the attenuation of said variable attenuator means in said one certain path in accordance with said read attenuator control information so that signals upon traversing said one specified line and said variable attenuator means and said amplifier means in said one certain path exhibit a signal strength within predetermined limits.

7. An audio-video switching system for interconnecting a plurality of audio-video stations comprising, switching means including at least an input stage and interstage links having transmit, receive and audio paths, variable attenuator means and fixed gain equalizer means connected in at least certain of said interstage link transmit paths, said variable attenuator means comprising a plurality of different valued attenuation networks, and means including memory means for varying the attenuation of said variable attenuator means by connecting into a selected one of said certain interstage link transmit paths selected of said different valued attenuation networks in accordance with attenuator control information stored in said memory means at a memory location associated with the communication path connecting the transmitting audio-video station to said one interstage link transmit path via said input stage.

8. The audio-video switching system in accordance with claim 7 wherein said memory means comprises, a memory having a plurality of addressable locations, each location associated with at least one of said audio-video stations and having stored therein attenuator control information defining an attenuation value having a predetermined relationship to the attenuation of the communication path from said at least one audio-video station to said switching means, and to the gain of said fixed gain equalizer means and means for addressing said memory at the memory location associated with said transmitting audio-video station to access said stored attenuator control information stored in said addressed memory location, and said varying means further comprises switch means for connecting said selected different valued attenuation networks into said one interstage link transmit path in accordance with said accessed stored attenuator control information.

9. The audio-video switching system in accordance with claim 8 wherein said addressing means addresses said memory at an address related to a line equipment number associated with said transmitting audio-video station.

10. A communication switching system wherein line equalization is provided on a common basis to a plurality of communication lines, which comprises, switching means including at least an input stage and interstage links, each of said plurality of communication lines being connectible through said input stage to at least some of said interstage links, fixed gain amplifier means and variable attenuation means, comprising a plurality of different valued attenuation circuits, connected in one of said interstage links, means including storage means for varying the attenuation of said variable attenuation means by switching into said one interstage link selected of said different valued attenuation circuits in accordance with attenuator control information stored in said storage means and related to the attenuation of the communication path to be connected to said one interstage link and to the gain of said fixed gain amplifier means.

11. In an audio-video switching system comprising at least two switching stages having an audio link, a video transmit link, and a video receive link therebetween; and a plurality of audio-video stations each having a communication path for transmitting video data to one of said stages, a video communication path equalization arrangement comprising, a fixed gain equalizer and variable attenuator serially connected in said video transmit interstage link, said variable attenuator comprising a plurality of different valued attenuator circuits and a plurality of switch means individually controllable to connect selected ones of said different valued attenuator circuits to said video transmit interstage link, a memory containing a plurality of addressable locations each associated with at least one of said audio-video stations and having stored therein attenuator control information related to the difference between the fixed gain of said fixed gain equalizer and the attenuation of said communication path from one of said at least one audio-video stations to said one stage, a common control responsive to a calling one of said audio-video stations for controlling said switching stages to establish a connection from the communication path of said calling audio-video station through said stages via said video transmit interstage link, and means including said common control for obtaining the attenuator control information in said memory in the location associated with said calling audio-video station, and for individually controlling selected ones of said plurality of switching means in said variable attenuator to connect ones of said different valued attenuator circuits to said video transmit interstage link in accordance with said obtained attenuator control information.

* * * * *

UNITED STATES PATENT OFFICE
CERTIFICATE OF CORRECTION

Patent No. 3,806,658 Dated April 23, 1974

Inventor(s) Harold Peter Anderson and George Albert Lesser

It is certified that error appears in the above-identified patent and that said Letters Patent are hereby corrected as shown below:

Column 8, between lines 56 and 57, "again" should read -- gain --. Column 9, line 1, cancel "conditioning".

Signed and sealed this 15th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334